Patented Apr. 13, 1926.

1,581,000

UNITED STATES PATENT OFFICE.

HENRY W. DAHLBERG, OF DENVER, COLORADO.

PROCESS OF MANUFACTURING YEAST.

No Drawing.   Application filed March 5, 1925.   Serial No. 13,400.

*To all whom it may concern:*

Be it known that I, HENRY W. DAHLBERG, a citizen of the United States, residing at Denver, in the county of Denver and State of Colorado, have invented new and useful Improvements in Processes of Manufacturing Yeast, of which the following is a specification.

This invention relates to the production of baker's yeast and pertains particularly to the preparation of a yeast mash and the maintenance of conditions advantageous to the propagation of yeast.

This application is a continuation in part of my application, Serial No. 566,857, filed June 8, 1922, which describes broadly a process of treating a mash for the reception of yeast by adding beet waste water which includes the beet extractive matter originally in beet molasses and from which the available sugar content has been removed. In that process, beet molasses is desugarized by treatment with an alkaline earth metal and the sugar precipitated as a saccharate of calcium or strontium or barium. The supernatant liquid or so-called waste water-containing organic nitrogenous matter, mineral salts, and a small percentage of sugar, is separated from the saccharate and constitutes a highly satisfactory yeast nutrient which may be used in conjunction with any yeast mash containing saccharine material, such as beet molasses, cane molasses, grain, malt, or sugar in any form.

As described in application, Serial No. 566,857, the method of procedure heretofore has been, to make a yeast nutrient solution consisting essentially of cane molasses, waste water and water, and propagating yeast therein. It has been found that it is more advantageous to add the waste water in stages as the fermentation proceeds, under controlled conditions. The natural alkalinity of the waste water obtained as a by-product of desugarizing processes can be used to advantage to regulate the acidity of the mash during the growth of the yeast. This is important because certain acids are liberated during the fermentation, and an excess of acidity is deleterious to the growth of the yeast.

The objects of the present invention are, therefore, to prevent any excess acidity by the proper addition of waste water and to furnish practically all of the nitrogen requirements of the yeast cells in the form of organic nitrogen, the most desirable form of nitrogen for this purpose.

The amount of waste water to be added at the different intervals, is predetermined, and depends upon the hydrogen-ion concentration in the mash. It is to be noted that in the process to be described, the hydrogen-ion concentration is not otherwise regulated by the use of foreign matter by the addition of ammonia or other chemicals, such as the various yeast nourishing inorganic salts, such as heretofore may have been the practice in artificial regulation. It is regulated entirely by using a by-product as it comes from the desugarizing processes.

Steffen waste water, and the waste waters produced by the barium or strontium processes are equally applicable. Steffen waste water is that which is produced during the process of desugarizing beet molasses by means of powdered lime. It is more or less alkaline in character, and is rich in the desired amino nitrogen organic compounds.

The following is an example of the procedure employed in carrying out the present invention:

4500 lbs. of ordinary "blackstrap" cane molasses mixed with 500 lbs. waste water containing 50% dry substance, is diluted with water to a density of 20° Balling, and clarified as follows:—

Commercial superphosphate to the extent of 3% of the weight of the original molasses is added, the mixture is heated to boiling, made slightly alkaline with caustic soda or slaked lime, and filtered. Approximately one-half of the filtered molasses solution, which is termed Solution I, is then diluted to a density of 1.6° Balling, 110 lbs. of ammonium phosphate added, and acidified with sulphuric acid to an acidity corresponding to a hydrogen-ion concentration ($P_h$) of 4.0 to 5.0.

A second solution, Solution II, is made up by mixing the remaining one-half of the above filtered molasses solution at 20° Balling, with 2000 lbs. of waste water containing 50% dry substance, and diluting with water to a density of 20° Balling.

To the mash consisting of Solution I at 1.6° Balling, at a temperature of 26° C., seed yeast is added and fermentation begun. Fermentation is continued for fourteen hours and at intervals of one-half hour the hydrogen-ion concentration is determined. At these one-half hour intervals, a sufficient quantity of the alkaline Solution II is added to the mash to maintain the desired hydrogen-ion concentration between the range $P_h4.0$ to $P_h4.4$. The density of the mash is also gradually raised by the addition of the 20° Balling solution, so that the final density at the end of the fermentation period is 3.8° Balling.

The quantity of Solution II which is added, varies both with the alkalinity of the original waste water, and the speed of fermentation of the mash, but will approximate 3.5 to 4% of the entire amount of Solution II every half hour, the total being added in the fourteen hours.

The proportions and the operating conditions cited above, are merely illustrative and may be varied within reasonable limits.

From the foregoing, it will be obvious that the present invention provides for the use of the particular materials extracted from sugar beets and thus identified as sugar beet extractive matter, and further, that the present invention provides for a particular manner of using this beet extractive matter by adding it from time to time to a previously prepared mash, and in accordance with the conditions set forth. The particular extractive matter recommended is the waste water remaining after sugar has been removed from syrups and particularly after sugar has been removed from sugar beet syrups. Also, it will be understood that the present invention teaches broadly the periodic use of alkaline waste water resulting from the desugarizing of sugar containing liquids as an alkaline nutrient for the treatment of mashes and particularly as used in accordance with the specific conditions defined.

I claim:—

1. The process of manufacturing yeast with the periodic use of waste water as a yeast nutrient and mash regulator, which process consists in propagating yeast in a mash, and from time to time adding portions of a solution containing the alkaline waste water produced in the desugarizing of a sugar containing liquid when sugar is removed therefrom as an alkaline earth metal saccharate by addition of an alkaline earth metal compound.

2. The process of manufacturing yeast with the periodic use of waste water as a yeast nutrient and mash regulator, which process consists in propagating yeast in a mash, and from time to time adding portions of a solution containing waste water containing beet extractive matter and produced in the desugarizing of a beet sugar containing liquid when sugar is removed therefrom as an alkaline earth metal saccharate by addition of an alkaline earth metal compound.

3. The process of manufacturing yeast with the periodic use of waste water as a yeast nutrient and mash regulator, propagating yeast in a mash, and from time to time adding portions of a yeast nutrient prepared from molasses and the alkaline waste water obtained in the desugarizing of a sugar containing liquid when sugar is removed therefrom as an alkaline earth metal saccharate by addition of an alkaline earth metal compound.

4. The process of manufacturing yeast with the periodic use of waste water as a yeast nutrient and mash regulator, which process consists in propagating yeast in a mash, and adding a solution containing the alkaline waste water produced in the desugarizing of a sugar containing liquid when sugar is removed therefrom as an alkaline earth metal saccharate by addition of an alkaline earth metal compound.

5. The process of manufacturing yeast with the periodic use of waste water as a yeast nutrient and mash regulator, which process consists in propagating yeast in a mash, and from time to time adding enough of an alkaline yeast nutrient containing waste water produced in the desugarizing of a sugar containing liquid when sugar is removed therefrom as an alkaline earth metal saccharate by addition of an alkaline earth metal compound to keep the hydrogen-ion concentration within the limits suitable for the propagation of said yeast.

6. The process of manufacturing yeast with the periodic use of waste water as a yeast nutrient and mash regulator, which process consists in propagating yeast in a mash containing the alkaline waste water produced in the desugarizing of a sugar containing liquid when sugar is removed therefrom as an alkaline earth metal saccharate by addition of an alkaline earth metal compound, and from time to time adding a yeast nutrient solution containing waste water similar in origin to the said first named waste water.

7. The process of manufacturing yeast with the periodic use of waste water as a yeast nutrient and mash regulator, which process consists in propagating yeast in a mash containing waste water produced in the desugarizing of a beet sugar containing liquid, when sugar is removed therefrom as an alkaline earth metal saccharate by addition of an alkaline earth metal compound and from time to time adding a yeast nutrient solution containing waste water similar in origin to the said first named waste water.

8. The process of manufacturing yeast with the periodic use of waste water as a yeast nutrient and mash regulator, which process consists in propagating yeast in a mash containing the alkaline waste water produced in the desugarizing a sugar containing liquid when sugar is removed therefrom as an alkaline earth metal saccharate by addition of an alkaline earth metal compound, and from time to time adding amounts of a solution containing waste water produced in the desugarizing of a sugar containing liquid.

9. The process of manufacturing yeast with the periodic use of waste water as a yeast nutrient and mash regulator, which process consists in propagating yeast in a mash containing waste water produced in the desugarizing of a sugar containing liquid, and from time to time adding amounts of a solution containing waste water produced in the desugarizing of a beet sugar containing liquid, when sugar is removed therefrom as an alkaline earth metal saccharate by addition of an alkaline earth metal compound.

10. The process of manufacturing yeast with the periodic use of waste water as a yeast nutrient and mash regulator, which process consists in propagating yeast in a mash containing waste water produced in the desugarizing of a sugar containing liquid, and adding a solution containing the alkaline waste water produced in the desugarizing of a sugar containing liquid when sugar is removed therefrom as an alkaline earth metal saccharate by addition of an alkaline earth metal compound in fractions at intervals depending on the hydrogen-ion concentration during said propagation and to maintain the concentration.

11. The process of manufacturing yeast, which process consists in propagating yeast in a mash containing waste water produced in the desugarizing of a sugar containing liquid, and from time to time adding enough of an alkaline yeast nutrient containing waste water produced in the desugarizing of a sugar containing liquid when sugar is removed therefrom as an alkaline earth metal saccharate by addition of an alkaline earth metal compound to keep the hydrogen-ion concentration within the limits suitable for the propagation of said yeast.

12. The process of manufacturing yeast, which process consists in propagating the yeast in a mash containing the alkaline waste water produced in the desugarizing of a sugar containing liquid when sugar is removed therefrom as an alkaline earth metal saccharate by addition of an alkaline earth metal compound, and at one-half hour intervals adding amounts of an alkaline solution containing waste water produced in the desugarizing of a sugar containing liquid when sugar is removed therefrom as an alkaline earth metal saccharate by addition of an alkaline earth metal compound, and depending on the hydrogen-ion concentration during said propagation and to maintain the concentration.

13. The process of manufacturing yeast with the periodic use of waste water as a yeast nutrient and mash regulator, which process consists in propagating yeast in a mash containing alkaline waste water produced in the desugarizing of a sugar containing liquid, when sugar is removed therefrom as an alkaline earth metal saccharate by addition of an alkaline earth metal compound, and at one-half hour intervals adding portions of a yeast nutrient alkaline in character and containing waste water produced in the desugarizing of a sugar containing liquid when sugar is removed therefrom as an alkaline earth metal saccharate by addition of an alkaline earth metal compound to thereby keep the hydrogen-ion concentration within limits suitable for the propagation of yeast.

14. The process of manufacturing yeast with the periodic use of waste water as a yeast nutrient and mash regulator, which process consists in propagating yeast in a mash, and at one-half hour intervals adding a quantity of an alkaline yeast nutrient containing waste water produced in the desugarizing of a sugar containing liquid when sugar is removed therefrom as an alkaline earth metal saccharate by addition of an alkaline earth metal compound, said quantity being sufficient to maintain a hydrogen-ion concentration during said propagation between the range of $P_h$ 4.0 to $P_h$ 4.4.

15. The process of manufacturing yeast with the periodic use of waste water as a yeast nutrient and mash regulator, which process consists in propagating yeast in a mash, and at one-half hour intervals adding a quantity of an alkaline yeast nutrient containing waste water produced in the desugarizing of a beet sugar containing liquid when sugar is removed therefrom as an alkaline earth metal saccharate by addition of an alkaline earth metal compound, said quantity being sufficient to maintain a hydrogen-ion concentration during said propagation between the range of $P_h$ 4.0 to $P_h$ 4.4

In testimony whereof I affix my signature.
HENRY W. DAHLBERG.